US009810466B2

(12) United States Patent
Honda

(10) Patent No.: US 9,810,466 B2
(45) Date of Patent: Nov. 7, 2017

(54) HEAT PUMP SYSTEM

(75) Inventor: Masahiro Honda, Ostend (BE)

(73) Assignee: Daikin Industries, Ltd., Osaka (JP)

( * ) Notice: Subject to any disclaimer, the term of this patent is extended or adjusted under 35 U.S.C. 154(b) by 816 days.

(21) Appl. No.: 13/202,374

(22) PCT Filed: Feb. 23, 2010

(86) PCT No.: PCT/JP2010/001184
§ 371 (c)(1),
(2), (4) Date: Aug. 19, 2011

(87) PCT Pub. No.: WO2010/098071
PCT Pub. Date: Sep. 2, 2010

(65) Prior Publication Data
US 2012/0036876 A1 Feb. 16, 2012

(30) Foreign Application Priority Data
Feb. 24, 2009 (JP) ................. 2009-040981

(51) Int. Cl.
*F25B 27/00* (2006.01)
*F25B 49/02* (2006.01)
(Continued)

(52) U.S. Cl.
CPC ........ *F25B 49/022* (2013.01); *F24D 11/0214* (2013.01); *F24D 17/02* (2013.01);
(Continued)

(58) Field of Classification Search
CPC .. F25B 6/02; F25B 13/00; F25B 30/02; F25B 2700/193; F25B 49/00; F25B 49/02;
(Continued)

(56) References Cited

U.S. PATENT DOCUMENTS 5,724,827 A * 3/1998 Yamaguchi et al. ............ 62/201
5,906,104 A * 5/1999 Schwartz .............. F24F 5/0071
237/2 B
(Continued)

FOREIGN PATENT DOCUMENTS

EP 1526341 A1 4/2005
GB 2244152 A 11/1991
(Continued)

OTHER PUBLICATIONS

Toshiyuki et al., Heat Pump Device, Feb. 7, 2008, (JP2008025885(A)), Whole Document.*
(Continued)

*Primary Examiner* — Larry Furdge
(74) *Attorney, Agent, or Firm* — Global IP Counselors, LLP

(57) ABSTRACT

A heat pump system includes a heat source unit having a variable-capacity compressor and a heat-source-side heat exchanger that functions as an evaporator for a refrigerant, and a plurality of usage units connected to the heat source unit and having usage-side heat exchangers that function as radiators for the refrigerant. The operating capacity of the compressor is controlled to bring the discharge pressure of the compressor, or a state quantity equivalent to the discharge pressure, to a first target value. The first target value is determined based on an equivalent target value equivalent to a usage temperature required in individual usage units.

3 Claims, 4 Drawing Sheets

(51) Int. Cl.
    *F24D 11/02*     (2006.01)
    *F24D 17/02*     (2006.01)
    *F25B 13/00*     (2006.01)
    *F25B 30/02*     (2006.01)

(52) U.S. Cl.
    CPC .............. *F25B 13/00* (2013.01); *F25B 30/02*
        (2013.01); *F25B 2313/02334* (2013.01); *F25B*
        *2313/02741* (2013.01); *F25B 2339/047*
        (2013.01); *F25B 2400/13* (2013.01); *F25B*
        *2600/021* (2013.01); *F25B 2600/0253*
        (2013.01); *F25B 2600/2515* (2013.01); *F25B*
        *2700/1931* (2013.01); *F25B 2700/2104*
        (2013.01); *F25B 2700/2106* (2013.01); *F25B*
        *2700/21161* (2013.01); *F25B 2700/21163*
        (2013.01); *Y02B 30/126* (2013.01); *Y02B*
        *30/741* (2013.01)

(58) Field of Classification Search
    CPC ........ F25B 2313/029; F25B 2313/0291; F25B
        2313/293; F25B 2600/21; F25B
        2313/0311; F25B 2313/0313; F25B
        2313/0314; F25B 2313/0315; F25B
        2600/02; F25B 2600/027; F25B
        2600/0271; F25B 2600/272; F25B
        2600/17; F25B 2600/19
    USPC ........................................................ 62/228.3
    See application file for complete search history.

(56) References Cited

U.S. PATENT DOCUMENTS

| 2002/0014085 | A1* | 2/2002 | Sakakibara et al. | 62/201 |
| 2002/0162342 | A1* | 11/2002 | Weng et al. | 62/156 |
| 2007/0051119 | A1* | 3/2007 | Hayashi | F25B 5/02 |
| | | | | 62/183 |

FOREIGN PATENT DOCUMENTS

| JP | 2-57875 A | | 2/1990 | |
| JP | H02057875 A | * | 2/1990 | F25B 29/00 |
| JP | 3-7858 A | | 1/1991 | |
| JP | 3-51677 A | | 3/1991 | |
| JP | 7-62569 B | | 7/1995 | |
| JP | H116665 A | * | 1/1999 | |
| JP | 2000-46417 A | | 2/2000 | |
| JP | 2005016754 A | * | 1/2005 | |
| JP | 2005-127687 A | | 5/2005 | |
| JP | 2006029744 A | * | 2/2006 | F24F 5/00 |
| JP | 2008025885 A | * | 2/2008 | |
| JP | 2008032376 A | * | 2/2008 | F24D 17/00 |

OTHER PUBLICATIONS

Minoru et al., Refrigeration Cycle Device, Jan. 20, 2005, JP2005016754A, Whole Document.*
International Search Report of corresponding PCT Application No. PCT/JP2010/001184.
International Preliminary Report of corresponding PCT Application No. PCT/JP2010/001184.
European Search Report of corresponding EP Application No. 10 74 5958.8 dated Jan. 14, 2015.

* cited by examiner

HEAT PUMP SYSTEM

CROSS-REFERENCE TO RELATED APPLICATIONS

This U.S. National stage application claims priority under 35 U.S.C. §119(a) to Japanese Patent Application No. 2009-040981, filed in Japan on Feb. 24, 2009, the entire contents of which are hereby incorporated herein by reference.

Technical Field

The present invention relates to a heat pump system for operation with a plurality of usage units connected to a single heat source.

Background Art

Various hot-water air-warming devices of a heat pump type provided with a plurality of usage-side units have been proposed to date, such as the device disclosed in Japanese Laid-open Patent Application 2000-46417. An example of such a heat pump system for operation with a plurality of usage units used for different applications connected to a single heat source is a system in which hot-water heating units for carrying out hot-water-circulation type air-warming such as floor air-warming or for supplying hot water, and air conditioning units, may be connected as usage units to a heat source, with a plurality of hot-water heating units and air conditioning units being multi-connectable in parallel as needed. In this case, in hot-water heaters for carrying out hot-water-circulation-type air warming such as floor air-warming, or for supplying hot water, control of the apparatus is carried out constantly to ensure that the supplied outlet-side water temperature is at a particular temperature.

SUMMARY

However, in a case where hot water from individual hot-water heaters on the usage unit side is for use in different applications, the outlet temperatures required of the hot water will differ; therefore, a technical problem encountered with such heat pump systems that are operated with a plurality of hot-water heaters for different applications connected to a single heat source involves determining how to supply refrigerant to the individual usage units.

An object of the present invention is to provide a heat pump system for operation with a plurality of usage units intended for different applications and connected to a single heat source, wherein the heat pump system can supply refrigerant in an optimum manner to the individual units.

The heat pump system according to a first aspect is provided with a heat source unit having a variable-capacity compressor and a heat-source-side heat exchanger functioning as an evaporator for a refrigerant; and a plurality of usage units connected to the heat source unit and having a usage-side heat exchanger that functions as a radiator for the refrigerant. The heat pump system controls the operating capacity of the compressor to bring the discharge pressure of the compressor, or a state quantity equivalent thereto, to a first target value. The first target value is determined on the basis of an equivalent target value equivalent to a usage temperature required in individual usage units.

According to the aspect described above, the operating capacity of the compressor is controlled to bring the discharge pressure of the compressor or a state quantity equivalent thereto to a first target value, and additionally, the first target value is determined on the basis of an equivalent target value equivalent to a usage temperature required in individual usage units, whereby in a heat pump system for operation with a plurality of usage units intended for different applications connected to a single heat source, refrigerant can be supplied in an optimum manner to individual usage units.

A heat pump system according to a second aspect is the heat pump system according to the first aspect wherein the plurality of usage units include a plurality of first usage units capable of heating an aqueous medium through radiation by the refrigerant in the individual usage-side heat exchangers. The equivalent target value is a first equivalent target value based on an aqueous medium temperature equivalent to the usage temperature required in the individual first usage units. The first target value is determined on the basis of the greatest value among the equivalent target values of the individual first usage units.

According to the aspect described above, the equivalent target value is a first equivalent target value based on an aqueous medium temperature equivalent to the usage temperature required in each of the plurality of first usage units, and the first target value is determined on the basis of the greatest value among the equivalent target values of the individual first usage units, whereby it is possible to carry out optimum refrigerant control for all of the first usage units.

The heat pump system according to a third aspect is the heat pump system according to the second aspect wherein the first usage unit for which the first target value is greater than the first equivalent target value carries out a control of a refrigerant flow rate control element means, using a correction value based on a differential of the first target value and the first equivalent target value.

According to the aspect described above, a first usage unit for which the first target value is greater than the first equivalent target value carries out control of refrigerant flow rate control means, using a correction value based on the differential of the first target value and the first equivalent target value, whereby it is possible to carry out optimum refrigerant control for all of the first usage units.

The heat pump system according to a fourth aspect is the heat pump system according to the third aspect wherein control of the refrigerant flow rate control means is carried out by modifying a degree of subcooling setting value.

According to the aspect described above, control of the refrigerant flow rate control means is carried out by modifying a degree of subcooling setting value, whereby it is possible to carry out optimum refrigerant control for all of the first usage units, in such a way that the degree of subcooling in the usage-side heat exchangers of the first usage units is constant.

The heat pump system according to a fifth aspect is the heat pump system according to the first aspect wherein the plurality of usage units includes a first usage unit capable of heating an aqueous medium through radiation by the refrigerant in a usage-side heat exchanger; and a second usage unit capable of heating an air medium through radiation by the refrigerant in a usage-side heat exchanger. The equivalent target values include a first equivalent target value relating to an aqueous medium temperature equivalent to a usage temperature required in the first usage unit, and a second equivalent target value relating to an air medium temperature equivalent to a usage temperature required in the second usage units. The first target value is determined on the basis of the greater of the first equivalent target value and the second equivalent target value of the individual usage units.

According to the aspect described above, equivalent target values include a first equivalent target value relating to an aqueous medium temperature equivalent to a usage temperature required in the first usage unit, and a second equivalent target value relating to an air medium temperature equivalent to a usage temperature required in the second usage units; and moreover the first target value is determined on the basis of the greater of the first equivalent target value and the second equivalent target value of the individual usage units. Because of this, it is possible to carry out optimum refrigerant control for all of the first and second usage units.

The heat pump system according to a sixth aspect is the heat pump system according to the fifth aspect wherein, in a case where the first target value is greater than the second equivalent target value, a control is performed so that the fan airflow rate of the second usage unit decreases.

According to the aspect described above, in a case where the first target value is greater than the second equivalent target value, a control is performed to reduce the fan airflow rate of the second usage units, whereby refrigerant can be prevented from collecting in the second usage units.

DESCRIPTION OF EMBODIMENTS

The embodiments of the heat pump system of the present invention are described below based on the accompanying drawings.

(First embodiment)
<Configuration>
—Overall Configuration—

Figure 1:
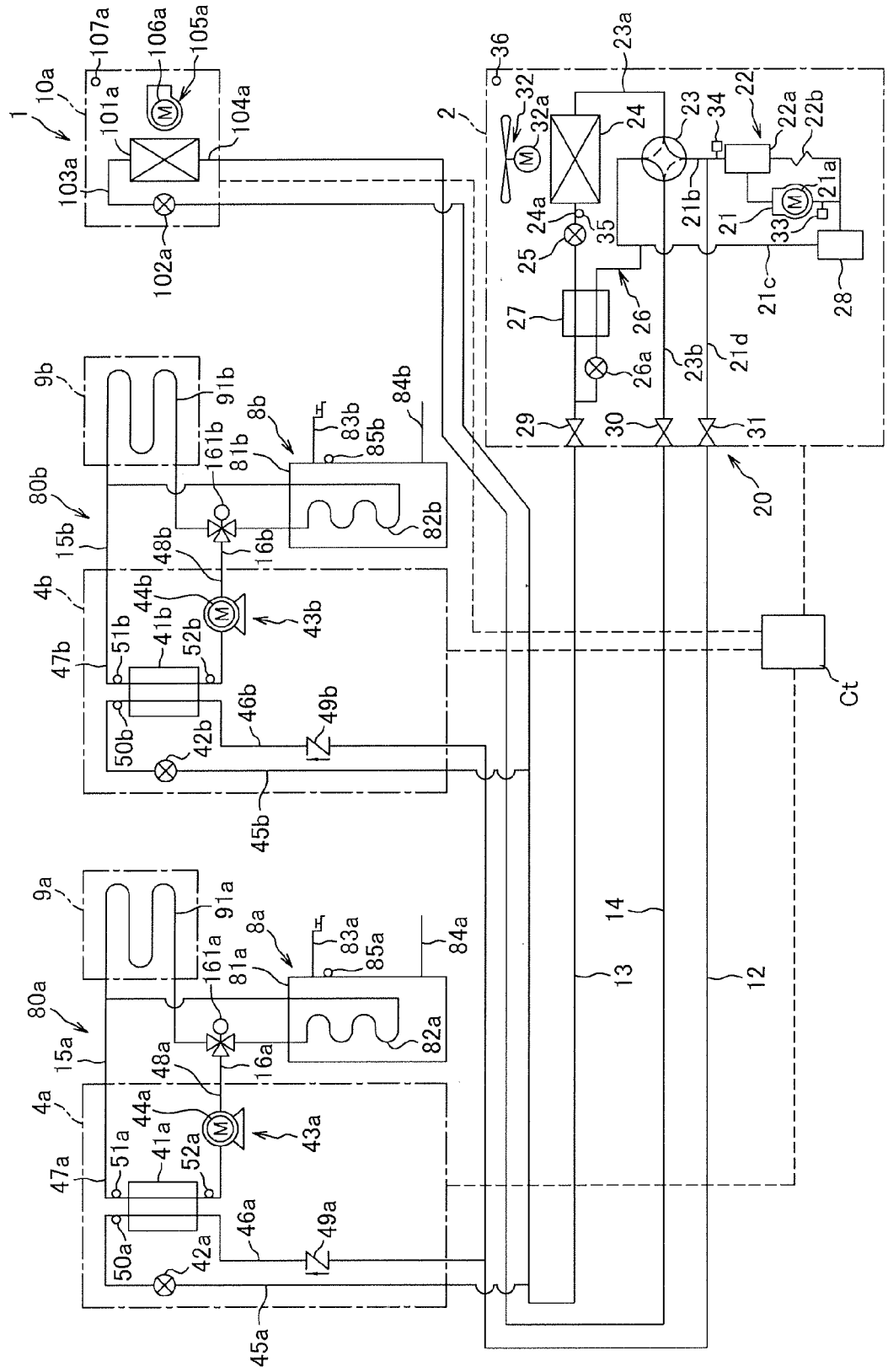
FIG. 1 is circuit diagram of a heat pump system according to a first embodiment of the present invention.

FIG. 1 is a view showing the general configuration of a heat pump system 1 according to a first embodiment of the present invention. The heat pump system 1 is an device capable of utilizing a vapor compression type heat pump cycle to carry out operations to heat an aqueous medium.

The heat pump system 1 is primarily provided with a heat source unit 2; two first usage units 4a, 4b; one second usage unit 10a; a discharge refrigerant communication tube 12; a liquid refrigerant communication tube 13; a gas refrigerant communication tube 14; two hot-water storage units 8a, 8b; two hot-water air-warming units 9a, 9b; aqueous medium communication tubes 15a, 15b; and aqueous medium communication tubes 16a, 16b. The heat source unit 2, the first usage units 4a, 4b, and the second usage unit 10a are connected via the refrigerant communication tubes 12, 13, 14, thereby constituting a heat-source-side refrigerant circuit 20; while the first usage units 4a, 4b, the hot-water storage units 8a, 8b, and the hot-water air-warming units 9a, 9b are connected via the aqueous medium communication tubes 15a, 15b, 16a, 16b, thereby constituting aqueous medium circuits 80a, 80b. HFC-410A, which is a type of HFC-based refrigerant, is enclosed in the heat-source-side refrigerant circuit 20 as the heat-source-side refrigerant, while an ester-based or ether-based refrigerant machine oil having compatibility with the HFC-based refrigerant is enclosed in a heat-source-side compressor 21 (discussed later) for lubricating purposes. Water is circulated as an aqueous medium through the aqueous medium circuits 80a, 80b.

Groups of the two first usage units 4a, 4b of the first embodiment together with the units connected thereto, specifically, the group composed of a set of the first usage unit 4a, the hot-water storage unit 8a, and the hot-water air-warming unit 9a (the group having symbols with "a" appended thereto) and the group composed of a set of the first usage unit 4b, the hot-water storage unit 8b, and the hot-water air-warming unit 9b (the group having symbols with "b" appended thereto) are identical in configuration, and are connected, in parallel to one another, to the refrigerant communication tubes 12, 13, 14.

—Heat Source Unit—

The heat source unit 2 is installed outdoors, and is connected to the usage units 4a, 4b, 10a via the refrigerant communication tubes 12, 13, 14, to constitute a part of the heat-source side refrigerant circuit 20.

The heat source unit 2 has primarily a heat-source-side compressor 21, an oil separation mechanism 22, a heat-source-side switching mechanism 23, a heat-source-side heat exchanger 24, a heat-source-side expansion valve 25, an intake return tube 26, a subcooler 27, a heat-source-side accumulator 28, a liquid-side shutoff valve 29, a gas-side shutoff valve 30, and a discharge-side shutoff valve 31.

The heat-source-side compressor 21 is a mechanism for compressing the heat-source-side refrigerant. The heat-source-side compressor 21 used herein is an airtight compressor in which a rotary-type, scroll-type, or other positive-displacement compression element (not shown) housed in a casing (not shown) is driven by a heat-source-side compressor motor 21a which is also housed in the casing. A high-pressure space (not shown) filled by the heat-source-side refrigerant after compression in the compression element is formed inside the casing of the heat-source-side compressor 21, and refrigeration machine oil is stored in the high-pressure space. The rotation speed (i.e., the operating frequency) of the heat-source-side compressor motor 21a can be varied by an inverter apparatus (not shown), and the capacity of the heat-source-side compressor 21 can thereby be controlled.

The oil separation mechanism 22 is a mechanism for separating refrigeration machine oil included in the heat-source-side refrigerant that is discharged from the heat-source-side compressor 21 and returning the refrigeration machine oil to the intake of the heat-source-side compressor. The oil separation mechanism 22 has primarily an oil separator 22a provided to a heat-source-side discharge tube 21b of the heat-source-side compressor 21; and an oil return tube 22b for connecting the oil separator 22a and a heat-source-side intake tube 21c of the heat-source-side compressor 21. The oil separator 22a is a device for separating refrigeration machine oil included in the heat-source-side refrigerant that is discharged from the heat-source-side compressor 21. The oil return tube 22b has a capillary tube, and is a refrigerant tube for returning the refrigeration machine oil separated from the heat-source-side refrigerant in the oil separator 22a to the heat-source-side intake tube 21c of the heat source-side compressor 21.

The heat-source-side switching mechanism 23 is a four-way switching valve capable of switching between a heat-source-side radiating operation state in which the heat-source-side heat exchanger 24 functions as a radiator of the heat-source-side refrigerant, and a heat-source-side evaporating operation state in which the heat-source-side heat exchanger 24 functions as a evaporator of the heat-sourceside refrigerant. The heat-source-side switching mechanism 23 is connected to the heat-source-side discharge tube 21b, the heat-source-side intake tube 21c, a first heat-source-side gas refrigerant tube 23a connected to the gas side of the heat-source-side heat exchanger 24, and a second heat-source-side gas refrigerant tube 23b connected to the gas-side shutoff valve 30. The heat-source-side switching mechanism 23 is capable of switching for communicating the heat-source-side discharge tube 21b with the first heat-source-side gas refrigerant tube 23a, and communicating the second heat-source side gas refrigerant tube 23b with the heat-source-side intake tube 21c (this switching corresponding to the heat-source-side radiating operation state, indicated by solid lines in the heat-source-side switching mechanism 23 in FIG. 1). The heat-source-side switching mechanism 23 is also capable of switching for communicating the heat-source-side discharge tube 21b with the second heat-source-side gas refrigerant tube 23b, and communicating the first heat-source-side gas refrigerant tube 23a with the heat-source-side intake tube 21c (this switching corresponding to the heat-source-side evaporating operation state, indicated by dashed lines in the heat-source-side switching mechanism 23 in FIG. 1). The heat-source-side switching mechanism 23 is not limited to a four-way switching valve, and may configured so as to have a function for switching the same directions of heat-source-side refrigerant flow as those described above, through the use of a combination of a plurality of solenoid valves or the like, for example.

The heat-source-side heat exchanger 24 is a heat exchanger for functioning as a radiator or evaporator of the heat-source-side refrigerant by exchanging heat between the heat-source-side refrigerant and outdoor air. A heat-source-side liquid refrigerant tube 24a is connected to the liquid side of the heat-source-side heat exchanger 24, and the first heat-source-side gas refrigerant tube 23a is connected to the gas side thereof. The outdoor air for heat exchange with the heat-source-side refrigerant in the heat-source-side heat exchanger 24 is fed by a heat-source-side fan 32 which is driven by a heat-source-side fan motor 32a.

The heat-source-side expansion valve 25 is an electrical expansion valve for performing such functions as depressurizing the heat-source-side refrigerant flowing through the heat-source-side heat exchanger 24, and is provided to the heat-source-side liquid refrigerant tube 24a.

The intake return tube 26 is a refrigerant tube for diverting a portion of the heat-source-side refrigerant flowing through the heat-source-side liquid refrigerant tube 24a and returning the diverted refrigerant to the intake of the heat-source-side compressor 21, and in the present embodiment, one end of the intake return tube 26 is connected to the heat-source-side liquid refrigerant tube 24a, and the other end is connected to the heat-source-side intake tube 21c. An intake return expansion valve 26a, the opening degree of which can be controlled, is provided to the intake return tube 26. The intake return expansion valve 26a is composed of an electrical expansion valve.

The subcooler 27 is a heat exchanger for exchanging heat between the heat-source-side refrigerant flowing through the heat-source-side liquid refrigerant tube 24a and the heat-source side refrigerant flowing through the intake return tube 26 (more specifically, the heat-source-side refrigerant that has been depressurized by the intake return expansion valve 26a).

The heat-source-side accumulator 28 is provided to the heat-source-side intake tube 21c, and is a container for temporarily storing the heat-source-side refrigerant circulated through the heat-source-side refrigerant circuit 20 before the heat-source-side refrigerant is drawn into the heat-source-side compressor 21 from the heat-source-side intake tube 21c.

The liquid-side shutoff valve 29 is a valve provided at the connection between the heat-source-side liquid refrigerant tube 24a and the liquid refrigerant communication tube 13. The gas-side shutoff valve 30 is a valve provided at the connection between the second heat-source side gas refrigerant tube 23b and the gas refrigerant communication tube 14. The discharge-side shutoff valve 31 is a valve provided at the connection between the gas refrigerant communication tube 14 and a heat-source-side discharge branch tube 21d which is diverted from the heat-source-side discharge tube 21b.

Various sensors are provided to the heat source unit 2. Specifically, the heat source unit 2 is provided with a heat-source-side intake pressure sensor 33 for detecting a heat-source-side intake pressure Ps1, which is the pressure of the heat-source-side refrigerant in the intake of the heat-source-side compressor 21; a heat-source-side discharge pressure sensor 34 for detecting a heat-source-side discharge pressure Pd1, which is the pressure of the heat-source side refrigerant in the discharge of the heat-source-side compressor 21; a heat-source-side heat exchange temperature sensor 35 for detecting a heat-source-side heat exchanger temperature Thx, which is the temperature of the heat-source-side refrigerant in the liquid side of the heat-source-side heat exchanger 24; and an outdoor air temperature sensor 36 for detecting an outdoor air temperature To.

—Discharge Refrigerant Communication Tube—

The discharge refrigerant communication tube 12 is connected to the heat-source-side discharge branch tube 21d via the discharge-side shutoff valve 31, and is a refrigerant tube capable of directing the heat-source-side refrigerant to the outside of the heat source unit 2 from the discharge of the heat-source-side compressor 21 in any of the heat-source-side radiating operation state and the heat-source-side evaporating operation state of the heat-source side switching mechanism 23.

—Liquid Refrigerant Communication Tube—

The liquid refrigerant communication tube 13 is connected to the heat-source-side liquid refrigerant tube 24a via the liquid-side shutoff valve 29, and the liquid refrigerant communication tube 13 is a refrigerant tube capable of directing the heat-source-side refrigerant to the outside of the heat source unit 2 from the outlet of the heat-source-side heat exchanger 24 which functions as a radiator of the heat-source-side refrigerant when the heat-source side switching mechanism 23 is in the heat-source-side radiating operation state. The liquid refrigerant communication tube 13 is also a refrigerant tube capable of introducing the heat-source-side refrigerant from outside the heat source unit 2 into the inlet of the heat-source-side heat exchanger 24 which functions as an evaporator of the heat-source-side refrigerant when the heat-source-side switching mechanism 23 is in the heat-source-side evaporating operation state.

—Gas Refrigerant Communication Tube—

The gas refrigerant communication tube 14 is connected to the second heat-source-side gas refrigerant tube 23b via the gas-side shutoff valve 30. The gas refrigerant communication tube 14 is a refrigerant tube capable of introducing the heat-source-side refrigerant into the intake of the heat-source-side compressor 21 from outside the heat source unit 2 when the heat-source-side switching mechanism 23 is in the heat-source-side radiating operation state. The gas refrigerant communication tube 14 is also a refrigerant tube capable of directing the heat-source-side refrigerant to the outside of the heat source unit 2 from the discharge of the heat-source-side compressor 21 when the heat-source-side switching mechanism 23 is in the heat-source-side evaporating operation state.

<First Usage Units>

The first usage units 4a, 4b are installed indoors and are connected to the heat source unit 2 and the second usage unit 10a via the refrigerant communication tubes 12, 13, with the first usage units 4a, 4b being connected to one another as well, to constitute part of the heat-source-side refrigerant circuit 20. The first usage units 4a, 4b are also connected to the hot-water storage units 8a, 8b and the hot-water air-warming units 9a, 9b via the aqueous medium communication tubes 15a, 15b, 16a, 16b and constitute part of the aqueous medium circuits 80a, 80b.

The first usage units 4a, 4b primarily have first usage-side heat exchangers 41a, 41b, first usage-side flow rate adjustment valves 42a, 42b, and circulating pumps 43a, 43b.

The first usage-side heat exchangers 41a, 41b are heat exchangers that function as radiators for the heat-source-side refrigerant by carrying out heat exchange between the heat-source side refrigerant and the aqueous medium; first usage-side liquid refrigerant tubes 45a, 45b are connected to the liquid side of the flow path along which flows the heat-source-side refrigerant, while first usage-side discharge refrigerant tubes 46a, 46b are connected to the gas side of the flow path along which flows the heat-source-side refrigerant. First usage-side water inlet tubes 47a, 47b are connected to the inlet side of the flow path along which flows the aqueous medium, and first usage-side water outlet tubes 48a, 48b are connected to the outlet side of the flow path along which flows the aqueous medium. The liquid refrigerant communication tube 13 is connected to the first usage-side liquid refrigerant tubes 45a, 45b; the discharge refrigerant communication tube 12 is connected to the first usage-side discharge refrigerant tubes 46a, 46b; the aqueous medium communication tubes 15a, 15b are connected to the first usage-side water inlet tubes 47a, 47b; and the aqueous medium communication tubes 16a, 16b are connected to the first usage-side water outlet tubes 48a, 48b.

The first usage-side flow rate adjustment valves 42a, 42b are electrical expansion valves whereby, through control of the degree of opening thereof, it is possible to vary the flow rate of the heat-source-side refrigerant flowing through the first usage-side heat exchangers 41a, 41b; the valves are furnished to the first usage-side liquid refrigerant tubes 45a, 45b.

The first usage-side discharge refrigerant tubes 46a, 46b are furnished with first usage-side discharge non-return valves 49a, 49b that permit the heat-source-side refrigerant to flow from the discharge refrigerant communication tube 12 toward the first usage-side heat exchangers 41a, 41b, but prohibit the heat-source-side refrigerant from flowing from the first usage-side heat exchangers 41a, 41b toward the discharge refrigerant communication tube 12.

The circulating pumps 43a, 43b are mechanisms for pressurizing the aqueous medium; here, pumps in which centrifugal or positive-displacement type pump elements (not shown) are driven by circulating pump motors 44a, 44b are employed. The circulating pumps 43a, 43b are furnished to the first usage-side water outlet tubes 48a, 48b. The rotating speed (specifically, the operating frequency) of the circulating pump motors 44a, 44b can be varied by an inverter device (not shown), whereby capacity control of the circulating pumps 43a, 43b is possible.

Because of this, in the first usage units 4a, 4b, the first usage-side heat exchangers 41a, 41b function as radiators for the heat-source-side refrigerant that is introduced from the discharge refrigerant communication tube 12, whereby it is possible for the heat-source-side refrigerant which has radiated its heat in the first usage-side heat exchangers 41a, 41b to be introduced into the liquid refrigerant communication tube 13, and to carry out a hot-water supply operation to heat the aqueous medium by heat radiated from the heat-source-side refrigerant in the first usage-side heat exchangers 41a, 41b.

The first usage units 4a, 4b are also furnished with various types of sensors. Specifically, the first usage units 4a, 4b are furnished with first usage-side heat exchange temperature sensors 50a, 50b for detecting a first usage-side refrigerant temperature Tsc 1 which is the temperature of the heat-source-side refrigerant at the liquid side of the first usage-side heat exchangers 41a, 41b; aqueous medium inlet temperature sensors 51a, 51b for detecting an aqueous medium inlet temperature Twr which is the temperature of the aqueous medium at the inlet of the first usage-side heat exchangers 41a, 41b; and aqueous medium outlet temperature sensors 52a, 52b for detecting an aqueous medium outlet temperature Twl which is the temperature of the aqueous medium at the outlet of the first usage-side heat exchangers 41a, 41b.

<Hot-Water Storage Units>

The hot-water storage units 8a, 8b are installed indoors and are connected to the first usage units 4a, 4b via the aqueous medium communication tubes 15a, 15b, 16a, 16b, thereby constituting part of the aqueous medium circuits 80a, 80b.

The hot-water storage units 8a, 8b primarily have hot-water storage tanks 81a, 81b, and heat exchange coils 82a, 82b.

The hot-water storage tanks 81a, 81b are receptacles for collecting water as the aqueous medium for a hot water supply; hot-water supply tubes 83a, 83b for sending the aqueous medium in the form of hot water to a faucet, shower, or the like are connected to the top part thereof, and cold water supply tubes 84a, 84b for replenishing the aqueous medium consumed by the hot-water supply tubes 83a, 83b are connected to the bottom part thereof.

The heat exchange coils 82a, 82b are furnished inside the hot-water storage tanks 81a, 81b, and serve as heat exchangers that, by carrying out heat exchange between the aqueous medium circulating through the aqueous medium circuits 80a, 80b and the aqueous medium inside the hot-water storage tanks 81a, 81b, function as heaters for the aqueous medium inside the hot-water storage tanks 81a, 81b. The aqueous medium communication tubes 16a, 16b are connected to the inlets thereof, and the aqueous medium communication tubes 15a, 15b are connected to the outlets thereof.

Because of this, it is possible for the aqueous medium inside the hot-water storage tanks 81a, 81b to be heated by the aqueous medium that is heated in the first usage units 4a, 4b and circulated through the aqueous medium circuits 80a, 80b, and to be collected as hot water. While hot-water storage units of a design whereby the aqueous medium heated through heat exchange with the aqueous medium heated in the first usage units 4a, 4b is collected in hot-water storage tanks are employed here as the hot-water storage units 8a, 8b, hot-water storage units of a design whereby the aqueous medium heated in the first usage units 4a, 4b is collected in hot-water storage tanks may be employed as well.

The hot-water storage units 8a, 8b are furnished with various sensors. Specifically, the hot-water storage units 8a, 8b are furnished with hot-water storage temperature sensors 85a for detecting a hot-water storage temperature Twh which is the temperature of the aqueous medium collected in the hot-water storage tanks 81a, 81b.

<Hot-Water Air-Warming Units>

The hot-water air-warming units 9a, 9b are installed indoors, and are connected to the first usage units 4a, 4b via the aqueous medium communication tubes 15a, 15b, 16a, 16b, to constitute part of the aqueous medium circuits 80a, 80b.

The hot-water air-warming units 9a, 9b primarily have heat exchange panels 91a, 91b, and constitute radiators, floor air-warming panels, or the like.

In the case of radiators, the heat exchange panels 91a, 91b are furnished on an indoor wall or the like; or in the case of floor air-warming panels, are furnished below an indoor floor or the like. The panels 91a, 91b are heat exchangers that function as radiators of the aqueous medium circulating through the aqueous medium circuits 80a, 80b; and the aqueous medium communication tubes 16a, 16b are connected to the inlets thereof, while the aqueous medium communication tubes 15a, 15b are connected to the outlets thereof.

<Aqueous Medium Communication Tubes>

The aqueous medium communication tubes 15a, 15b are connected to the outlets of the heat exchange coils 82a, 82b of the hot-water storage units 8a, 8b and to the outlets of the heat exchange panels 91a, 91b of the hot-water air-warming units 9a, 9b. The aqueous medium communication tubes 16a, 16b are connected to the inlets of the heat exchange coils 82a, 82b of the hot-water storage units 8a, 8b and to the inlets of the heat exchange panels 91a, 91b of the hot-water air-warming units 9a, 9b. The aqueous medium communication tubes 16a, 16b are furnished with aqueous-medium-side switching mechanisms 161a, 161b capable of switching between supplying the aqueous medium circulating through the aqueous medium circuits 80a, 80b to both the hot-water storage units 8a, 8b and the hot water air-warming units 9a, 9b; or selectively to either the hot-water storage units 8a, 8b or the hot water air-warming units 9a, 9b. These aqueous-medium-side switching mechanisms 161a, 161b are composed of three-way valves.

—Second Usage Unit—

The second usage unit 10a is installed indoors, is connected to the heat source unit 2 via the refrigerant communication tubes 13, 14, and constitutes a portion of the heat-source-side refrigerant circuit 20.

The second usage unit 10a has primarily a second usage-side heat exchanger 101a and a second usage-side flow rate adjustment valve 102a.

The second usage-side heat exchanger 101a is a heat exchanger for functioning as a radiator or evaporator of the heat-source-side refrigerant by exchanging heat between the heat-source-side refrigerant and indoor air as the air medium, a second usage-side liquid refrigerant tube 103a is connected to the liquid side of the second usage-side heat exchanger 101a, and a second usage-side gas refrigerant tube 104a is connected to the gas side of the second usage-side heat exchanger 101a. The liquid refrigerant communication tube 13 is connected to the second usage-side liquid refrigerant tube 103a, and the gas refrigerant communication tube 14 is connected to the second usage-side gas refrigerant tube 104a. The air medium for exchanging heat with the heat-source-side refrigerant in the second usage-side heat exchanger 101a is fed by a usage-side fan 105a driven by a usage-side fan motor 106a.

The second usage-side flow rate adjustment valve 102a is an electrical expansion valve whereby the flow rate of heat-source-side refrigerant flowing through the second usage-side heat exchanger 101a can be varied by controlling the opening degree of the second usage-side flow rate adjustment valve 102a, and the second usage-side flow rate adjustment valve 102a is provided to the second usage-side liquid refrigerant tube 103a.

The second usage unit 10a is thereby configured so that an air-cooling operation can be performed in which the second usage-side heat exchanger 101a is caused to function as an evaporator of the heat-source-side refrigerant introduced from the liquid refrigerant communication tube 13 in the heat-source-side radiating operation state of the heat-source-side switching mechanism 23, whereby the heat-source-side refrigerant evaporated in the second usage-side heat exchanger 101a is directed to the gas refrigerant communication tube 14, and the air medium is cooled by evaporation of the heat-source-side refrigerant in the second usage-side heat exchanger 101a. The second usage unit 10a is also configured so that an air-warming operation can be performed in which the second usage-side heat exchanger 101a is caused to function as a radiator of the heat-source-side refrigerant introduced from the gas refrigerant communication tube 14 in the heat-source-side evaporating operation state of the heat-source-side switching mechanism 23, whereby the heat-source-side refrigerant radiated in the second usage-side heat exchanger 101a is directed to the liquid refrigerant communication tube 13, and the air medium is heated by radiation of the heat-source-side refrigerant in the second usage-side heat exchanger 101a.

Various sensors are provided to the second usage unit 10a. Specifically, the second usage unit 10a is provided with an outdoor temperature sensor 107a for detecting an outdoor temperature Tr.

<Operation>

Next, the operation of the heat pump system 1 is described.

The operating modes of the heat pump system 1 are a hot water-supply operating mode in which only hot-water supply operations by the first usage units 4a, 4b (i.e., operations by the hot-water storage units 8a, 8b and/or the hot-water air-warming units 9a, 9b) are carried out; an air-cooling operating mode in which only an air-cooling operation of the second usage unit 10a is carried out; an air-warming operating mode in which only an air warming operation of the second usage unit 10a is carried out; a hot-water supply/air-warming operating mode in which both hot-water supply operations by the first usage units 4a, 4b and an air-warming operation of the second usage unit 10a are carried out; and a hot-water supply/air-cooling operating mode in which both hot-water supply operations by the first usage units 4a, 4b and an air-cooling operation of the second usage unit 10a are carried out.

The operation in the five operating modes of the heat pump system 1 is described below.

—Hot-water supply operating mode—

In a case where only hot-water supply operations by the first usage units 4a, 4b are to be carried out, in the heat-source-side refrigerant circuit 20, a heat-source-side switching mechanism 23 switches to a heat-source-side evaporating operation state (the state of the heat-source-side switching mechanism 23 depicted by broken lines in FIG. 1); and an intake return expansion valve 26a and a second usage-side flow rate adjustment valve 102a go to the closed state. In the aqueous medium circuits 80a, 80b, the aqueous-medium-side switching mechanisms 161a, 161b are switched to a state of supplying the aqueous medium to the hot-water storage units 8a, 8b and/or the hot-water air-warming units 9a, 9b.

In the heat-source-side refrigerant circuit 20 in such a state, the heat-source-side refrigerant at a low pressure in the refrigeration cycle is drawn into the heat-source-side compressor 21 through the heat-source-side intake tube 21c and compressed to a high pressure in the refrigeration cycle, and subsequently discharged to the heat-source-side discharge tube 21b. In the oil separator 22a, the refrigeration machine oil is separated from the high-pressure heat-source-side refrigerant discharged to the heat-source-side discharge tube 21b. The refrigeration machine oil separated from the heat-source-side refrigerant in the oil separator 22a is returned to the heat-source-side intake tube 21c through the oil return tube 22b. The high-pressure heat-source-side refrigerant from which the refrigeration machine oil has been separated is sent from the heat source unit 2 to the discharge refrigerant communication tube 12 through the heat-source-side discharge branch tube 21d and the discharge-side shutoff valve 31.

The high-pressure, heat-source-side refrigerant fed to the discharge refrigerant communication tube 12 is then fed to the first usage units 4a, 4b. The high-pressure, heat-source-side refrigerant fed to the first usage units 4a, 4b is then fed to the first usage-side heat exchangers 41a, 41b through the first usage-side discharge refrigerant tubes 46a, 46b and the first usage-side discharge non-return valves 49a, 49b. In the first usage-side heat exchangers 41a, 41b, the high-pressure, heat-source-side refrigerant fed to the first usage-side heat exchangers 41a, 41b radiates heat through heat exchange with the aqueous medium circulated through the aqueous medium circuits 80a, 80b by the circulating pumps 43a, 43b. Through the first usage-side flow rate adjustment valves 42a, 42b and the first usage-side liquid refrigerant tubes 45a, 45b, the high-pressure, heat-source-side refrigerant that has radiated its heat in the first usage-side heat exchangers 41a, 41b is fed from the first usage units 4a, 4b to the liquid refrigerant communication tube 13.

The heat-source-side refrigerant sent to the liquid refrigerant communication tube 13 is sent to the heat source unit 2. The heat-source-side refrigerant sent to the heat source unit 2 is sent to the subcooler 27 through the liquid-side shutoff valve 29. Since the heat-source-side refrigerant does not flow in the intake return tube 26, the heat-source-side refrigerant sent to the subcooler 27 is sent to the heat-source-side expansion valve 25 without exchanging heat. The heat-source-side refrigerant sent to the heat-source-side expansion valve 25 is depressurized in the heat-source-side expansion valve 25 to a low-pressure gas-liquid two-phase state, and sent to the heat-source-side heat exchanger 24 through the heat-source-side liquid refrigerant tube 24a. The low-pressure refrigerant sent to the heat-source-side heat exchanger 24 is heat-exchanged with the outdoor air fed by the heat-source-side fan 32 and evaporated in the heat-source-side heat exchanger 24. The low-pressure heat-source-side refrigerant evaporated in the heat-source-side heat exchanger 24 is sent to the heat-source-side accumulator 28 through the first heat-source-side gas refrigerant tube 23a and the heat-source-side switching mechanism 23. The low-pressure heat-source-side refrigerant sent to the heat-source-side accumulator 28 is again drawn into the heat-source-side compressor 21 through the heat-source-side intake tube 21c.

Meanwhile, in the aqueous medium circuits 80a, 80b, the aqueous medium circulating through the aqueous medium circuits 80a, 80b is heated by heat radiated from the heat source-side refrigerant in the first usage-side heat exchangers 41a, 41b. The aqueous medium heated in the first usage-side heat exchangers 41a, 41b is drawn into the circulating pumps 43a, 43b through the first usage-side water outlet tubes 48a, 48b; and, after being pressurized, is fed from the first usage units 4a, 4b to the aqueous medium communication tubes 16a, 16b. The aqueous medium fed to the aqueous medium communication tubes 16a, 16b is fed to the hot-water storage units 8a, 8b and/or the hot-water air-warming units 9a, 9b through the aqueous-medium-side switching mechanisms 161a, 161b. In the heat exchange coils 82a, 82b, the aqueous medium fed to the hot-water storage units 8a, 8b radiates heat through heat exchange with the aqueous medium inside the hot-water storage tanks 81a, 81b, thereby heating the aqueous medium inside the hot-water storage tanks 81a, 81b. In the heat exchange panels 91a, 91b, the aqueous medium fed to the hot-water air-warming units 9a, 9b radiates heat, thereby heating an indoor wall or the like, or heating an indoor floor.

Operation in the hot-water supply operating mode, whereby only hot-water supply operations by the first usage units 4a, 4b are carried out, is carried out in the above manner.

In a case where the hot-water supply operation of either of the first usage units 4a, 4b is halted, and a hot-water supply operation is carried out only by the other, the first usage-side flow rate adjustment valve 42a, 42b of the first usage unit 4a, 4b whose hot-water supply operation is halted may be closed. The same applies to cases of the hot-water supply/air-warming operation and the hot-water supply/air-cooling operation to be discussed below.

—Air-Cooling Operating Mode—

In a case where only an air-cooling operation of the second usage unit 10a is to be carried out, in the heat-source-side refrigerant circuit 20, the heat-source-side switching mechanism 23 switches to a heat-source-side radiating operation state (the state of the heat-source side switching mechanism 23 depicted by solid lines in FIG. 1), and the first usage-side flow rate adjustment valves 42a, 42b go to the closed state.

In the heat-source-side refrigerant circuit 20 in such a state, the heat-source-side refrigerant at the low pressure in the refrigeration cycle is drawn into the heat-source-side compressor 21 through the heat-source-side intake tube 21c and compressed to the high pressure in the refrigeration cycle, and subsequently discharged to the heat-source-side discharge tube 21b. In the oil separator 22a, the refrigeration machine oil is separated from the high-pressure heat-source-side refrigerant discharged to the heat-source-side discharge tube 21b. The refrigeration machine oil separated from the heat-source-side refrigerant in the oil separator 22a is returned to the heat-source-side intake tube 21c through the oil return tube 22b. The high-pressure heat-source-side refrigerant from which the refrigeration machine oil has been separated is sent to the heat-source-side heat exchanger 24 through the heat-source-side switching mechanism 23 and the first heat-source-side gas refrigerant tube 23a. The high-pressure heat-source-side refrigerant sent to the heat-source-side heat exchanger 24 is heat-exchanged with the outdoor air fed by the heat-source-side fan 32 and radiated in the heat-source-side heat exchanger 24. The high-pressure heat-source-side refrigerant radiated in the heat-source-side heat exchanger is sent to the subcooler 27 through the heat-source-side expansion valve 25. The heat-source-side refrigerant sent to the subcooler 27 is heat-exchanged with the heat-source-side refrigerant diverted to the intake return tube 26 from the heat-source-side liquid refrigerant tube 24a, and is cooled to a subcooled state. The heat-source side refrigerant flowing through the intake return tube 26 is returned to the heat-source-side intake tube 21c. The heat-source-side refrigerant cooled in the subcooler 27 is sent from the heat source unit 2 to the liquid refrigerant communication tube 13 through the heat-source-side liquid refrigerant tube 24a and the liquid-side shutoff valve 29.

The high-pressure heat-source-side refrigerant sent to the liquid refrigerant communication tube 13 is sent to the second usage unit 10a. The high-pressure heat-source-side refrigerant sent to the second usage unit 10a is sent to the second usage-side flow rate adjustment valve 102a. The high-pressure heat-source-side refrigerant sent to the second usage-side flow rate adjustment valve 102a is depressurized in the second usage-side flow rate adjustment valve 102a to a low-pressure gas-liquid two-phase state, and sent to the second usage-side heat exchanger 101a through the second usage-side liquid refrigerant tube 103a. The low-pressure heat-source-side refrigerant sent to the second usage-side heat exchanger 101a is heat-exchanged with the air medium fed by the usage-side fan 105a and evaporated in the second usage-side heat exchanger 101a, and indoor air cooling is thereby performed. The low-pressure heat-source-side refrigerant evaporated in the second usage-side heat exchanger 101a is sent from the second usage unit 10a to the gas refrigerant communication tube 14 through the second usage-side gas refrigerant tube 104a.

The low-pressure heat-source-side refrigerant sent to the gas refrigerant communication tube 14 is sent to the heat source unit 2. The low-pressure heat-source-side refrigerant sent to the heat source unit 2 is sent to the heat-source-side accumulator 28 through the gas-side shutoff valve 30, the second heat-source-side gas refrigerant tube 23b, and the heat-source-side switching mechanism 23. The low-pressure heat-source-side refrigerant sent to the heat-source-side accumulator 28 is again drawn into the heat-source-side compressor 21 through the heat-source-side intake tube 21c.

The operations in the air-cooling operation mode for performing only the air-cooling operation of the second usage unit 10a are thus performed.

—Air-Warming Operating Mode—

In a case where only an air-warming operation of the second usage unit 10a is to be carried out, in the heat-source-side refrigerant circuit 20, the heat-source-side switching mechanism 23 switches to a heat-source-side radiating operation state (the state of the heat-source side switching mechanism 23 depicted by broken lines in FIG. 1), and the intake return expansion valve 26a and the first usage-side flow rate adjustment valves 42a, 42b go to the closed state.

In the heat-source-side refrigerant circuit 20 in such a state, the heat-source-side refrigerant at a low pressure in the refrigeration cycle is drawn into the heat-source-side compressor 21 through the heat-source-side intake tube 21c and compressed to a high pressure in the refrigeration cycle, and subsequently discharged to the heat-source-side discharge tube 21b. In the oil separator 22a, the refrigeration machine oil is separated from the high-pressure heat-source-side refrigerant discharged to the heat-source-side discharge tube 21b. The refrigeration machine oil separated from the heat-source-side refrigerant in the oil separator 22a is returned to the heat-source-side intake tube 21c through the oil return tube 22b. The high-pressure heat-source-side refrigerant from which the refrigeration machine oil has been separated is sent from the heat source unit 2 to the gas refrigerant communication tube 14 through the heat-source-side switching mechanism 23, the second heat-source-side gas refrigerant tube 23b, and the gas-side shutoff valve 30.

The high-pressure heat-source-side refrigerant sent to the gas refrigerant communication tube 14 is sent to the second usage unit 10a. The high-pressure heat-source-side refrigerant sent to the second usage unit 10a is sent to the second usage-side heat exchanger 101a through the second usage-side gas refrigerant tube 104a. The high-pressure heat-source-side refrigerant sent to the second usage-side heat exchanger 101a is heat exchanged with the air medium fed by the usage-side fan 105a and radiated in the second usage-side heat exchanger 101a, and indoor air warming is thereby performed. The high-pressure heat-source-side refrigerant radiated in the second usage-side heat exchanger 101a is sent from the second usage unit 10a to the liquid refrigerant communication tube 13 through the second usage-side flow rate adjustment valve 102a and the second usage-side liquid refrigerant tube 103a.

The heat-source-side refrigerant sent to the liquid refrigerant communication tube 13 is sent to the heat source unit 2. The heat-source-side refrigerant sent to the heat source unit 2 is sent to the subcooler 27 through the liquid-side shutoff valve 29. Since the heat-source-side refrigerant does not flow in the intake return tube 26, the heat-source-side refrigerant sent to the subcooler 27 is sent to the heat-source-side expansion valve 25 without exchanging heat. The heat-source-side refrigerant sent to the heat-source-side expansion valve 25 is depressurized in the heat-source-side expansion valve 25 to a low-pressure gas-liquid two-phase state, and sent to the heat-source-side heat exchanger 24 through the heat-source-side liquid refrigerant tube 24a. The low-pressure refrigerant sent to the heat-source-side heat exchanger 24 is heat-exchanged with the outdoor air fed by the heat-source-side fan 32 and evaporated in the heat-source-side heat exchanger 24. The low-pressure heat-source-side refrigerant evaporated in the heat-source-side heat exchanger 24 is sent to the heat-source-side accumulator 28 through the first heat-source-side gas refrigerant tube 23a and the heat-source-side switching mechanism 23. The low-pressure heat-source-side refrigerant sent to the heat-source-side accumulator 28 is again drawn into the heat-source-side compressor 21 through the heat-source-side intake tube 21c.

The operations in the air-warming operation mode for performing only the air-warming operation of the second usage unit 10a are thus performed.

—Hot-Water Supply/Air-Warming Operating Mode—

In a case where hot-water supply operation of the first usage units 4a, 4b and an air warming operation of the second usage unit 10a are to be carried out together, in the heat-source-side refrigerant circuit 20, the heat-source-side switching mechanism 23 switches to the heat-source-side evaporating operation state (the state of the heat-source-side switching mechanism 23 depicted by broken lines in FIG. 1); and the intake return expansion valve 26a goes to the closed state. In the aqueous medium circuits 80a, 80b, the aqueous-medium side switching mechanisms 161a, 161b switch to a state of supplying the aqueous medium to the hot-water storage units 8a, 8b and/or the hot-water air-warming units 9a, 9b.

In the heat-source-side refrigerant circuit 20 in such a state, the heat-source-side refrigerant at a low pressure in the refrigeration cycle is drawn into the heat-source-side compressor 21 through the heat-source-side intake tube 21c and compressed to a high pressure in the refrigeration cycle, and subsequently discharged to the heat-source-side discharge tube 21b. In the oil separator 22a, the refrigeration machine oil is separated from the high-pressure heat-source-side refrigerant discharged to the heat-source-side discharge tube 21b. The refrigeration machine oil separated from the heat-source-side refrigerant in the oil separator 22a is returned to the heat-source-side intake tube 21c through the oil return tube 22b. A portion of the high-pressure heat-source-side refrigerant from which the refrigeration machine oil has been separated is sent from the heat source unit 2 to the discharge refrigerant communication tube 12 through the heat-source-side discharge branch tube 21d and the discharge-side shutoff valve 31, and the remainder is sent from the heat source unit 2 to the gas refrigerant communication tube 14 through the second heat-source-side gas refrigerant tube 23b and the gas-side shutoff valve 30.

The high-pressure heat-source-side refrigerant sent to the gas refrigerant communication tube 14 is sent to the second usage unit 10a. The high-pressure heat-source-side refrigerant sent to the second usage unit 10a is sent to the second usage-side heat exchanger 101a through the second usage-side gas refrigerant tube 104a. The high-pressure heat-source-side refrigerant sent to the second usage-side heat exchanger 101a is heat exchanged with the air medium fed by the usage-side fan 105a and radiated in the second usage-side heat exchanger 101a, and indoor air warming is thereby performed. The high-pressure heat-source-side refrigerant radiated in the second usage-side heat exchanger 101a is sent from the second usage unit 10a to the liquid refrigerant communication tube 13 through the second usage-side flow rate adjustment valve 102a and the second usage-side liquid refrigerant tube 103a.

The high-pressure, heat-source-side refrigerant fed to the discharge refrigerant communication tube 12 is then fed to the first usage units 4a, 4b. The high-pressure, heat source-side refrigerant fed to the first usage units 4a, 4b is then fed to the first usage-side heat exchangers 41a, 41b through the first usage-side discharge refrigerant tubes 46a, 46b and the first usage-side discharge non-return valves 49a, 49b. In the first usage-side heat exchangers 41a, 41b, the high-pressure, heat-source-side refrigerant fed to the first usage-side heat exchangers 41a, 41b radiates heat through heat exchange with the aqueous medium circulated through the aqueous medium circuits 80a, 80b by the circulating pumps 43a, 43b. Through the first usage-side flow rate adjustment valves 42a, 42b and the first usage-side liquid refrigerant tubes 45a, 45b, the high-pressure, heat-source-side refrigerant that has radiated its heat in the first usage-side heat exchangers 41a, 41b is fed from the first usage units 4a, 4b to the liquid refrigerant communication tube 13.

The heat-source-side refrigerant fed into the liquid refrigerant communication tube 13 from the second usage unit 10a and the first usage units 4a, 4b converge in the liquid refrigerant communication tube 13, and are fed to the heat source unit 2. The heat-source-side refrigerant fed to the heat source unit 2 is fed to a subcooler 27 through a liquid-side shutoff valve 29. Because the heat-source-side refrigerant is not flowing in the intake return tube 26, the heat-source-side refrigerant fed to the subcooler 27 is fed to the heat-source-side expansion valve 25, without having undergone heat exchange. The heat-source-side refrigerant fed to the heat-source-side expansion valve 25 is depressurized in the heat-source-side expansion valve 25 where it assumes a low-pressure, gas-liquid two-phase state, and is fed to the heat-source-side heat exchanger 24 through the heat-source-side liquid refrigerant tube 24a. In the heat-source-side heat exchanger 24, the low-pressure refrigerant fed to the heat-source-side heat exchanger 24 undergoes heat exchange with outdoor air supplied by a heat-source-side fan 32, and evaporates. The low-pressure, heat-source-side refrigerant having evaporated in the heat-source-side heat exchanger 24 is fed to a heat-source-side accumulator 28 through a first heat-source-side gas refrigerant tube 23a and the heat-source-side switching mechanism 23. The low-pressure, heat-source-side refrigerant fed to the heat-source-side accumulator 28 is again drawn into the heat-source-side compressor 21 through the heat-source-side intake tube 21c.

Meanwhile, in the aqueous medium circuits 80a, 80b, the aqueous medium circulating through the aqueous medium circuits 80a, 80b is heated by heat radiated from the heat source-side refrigerant in the first usage-side heat exchangers 41a, 41b. The aqueous medium heated in the first usage-side heat exchangers 41a, 41b is drawn into the circulating pumps 43a, 43b through the first usage-side water outlet tubes 48a, 48b; and, after being pressurized, is fed from the first usage units 4a, 4b to the aqueous medium communication tubes 16a, 16b. The aqueous medium fed to the aqueous medium communication tubes 16a, 16b is fed to the hot-water storage units 8a, 8b and/or the hot-water air-warming units 9a, 9b through the aqueous-medium-side switching mechanisms 161a, 161b. In the heat exchange coils 82a, 82b, the aqueous medium fed to the hot-water storage units 8a, 8b radiates heat through heat exchange with the aqueous medium inside the hot-water storage tanks 81a, 81b, thereby heating the aqueous medium inside the hot-water storage tanks 81a, 81b. In the heat exchange panels 91a, 91b, the aqueous medium fed to the hot-water air-warming units 9a, 9b radiates heat, thereby heating an indoor wall or the like, or heating an indoor floor.

Operation in the hot-water supply/air-warming operating mode, whereby hot-water supply operations by the first usage units 4a, 4b and an air-warming operation of the second usage unit 10a are carried out together, is carried out in the above manner.

—Hot-Water Supply/Air-Cooling Operating Mode—

In a case where hot-water supply operations of the first usage units 4a, 4b and an air cooling operation of the second usage unit 10a are to be carried out together, in the heat-source-side refrigerant circuit 20, the heat-source-side switching mechanism 23 switches to the heat-source-side radiating operation state (the state of the heat-source-side switching mechanism 23 depicted by solid lines in FIG. 1). In the aqueous medium circuits 80a, 80b, the aqueous-medium-side switching mechanisms 161a, 161b switch to a state of supplying the aqueous medium to the hot-water storage units 8a, 8b.

In the heat-source-side refrigerant circuit 20 in such a state, the heat-source-side refrigerant at a low pressure in the refrigeration cycle is drawn into the heat-source-side compressor 21 through the heat-source-side intake tube 21c and compressed to a high pressure in the refrigeration cycle, and subsequently discharged to the heat-source-side discharge tube 21b. In the oil separator 22a, the refrigeration machine oil is separated from the high-pressure heat-source-side refrigerant discharged to the heat-source-side discharge tube 21b. The refrigeration machine oil separated from the heat-source-side refrigerant in the oil separator 22a is returned to the heat-source-side intake tube 21c through the oil return tube 22b. A portion of the high-pressure heat-source-side refrigerant from which the refrigeration machine oil has been separated is sent from the heat source unit 2 to the discharge refrigerant communication tube 12 through the heat-source-side discharge branch tube 21d and the discharge-side shutoff valve 31, and the remainder is sent to the heat-source-side heat exchanger 24 through the heat-sourceside switching mechanism 23 and the first heat-source-side gas refrigerant tube 23a. The high-pressure heat-source-side refrigerant sent to the heat-source side heat exchanger 24 is heat-exchanged with the outdoor air fed by the heat-source-side fan 32 and radiated in the heat-source-side heat exchanger 24. The high-pressure heat-source-side refrigerant radiated in the heat-source-side heat exchanger is sent to the subcooler 27 through the heat-source-side expansion valve 25. The heat-source-side refrigerant sent to the subcooler 27 is heat-exchanged with the heat-source-side refrigerant diverted to the intake return tube 26 from the heat-source-side liquid refrigerant tube 24a, and is cooled to a subcooled state. The heat-source-side refrigerant flowing through the intake return tube 26 is returned to the heat-source-side intake tube 21c. The heat-source-side refrigerant cooled in the subcooler 27 is sent from the heat source unit 2 to the liquid refrigerant communication tube 13 through the heat-source-side liquid refrigerant tube 24a and the liquid-side shutoff valve 29.

The high-pressure, heat-source-side refrigerant fed to the discharge refrigerant communication tube 12 is then fed to the first usage units 4a, 4b. The high-pressure, heat source-side refrigerant fed to the first usage units 4a, 4b is then fed to the first usage-side heat exchangers 41a, 41b through the first usage-side discharge refrigerant tubes 46a, 46b and the first usage-side discharge non-return valves 49a, 49b. In the first usage-side heat exchangers 41a, 41b, the high-pressure, heat-source-side refrigerant fed to the first usage-side heat exchangers 41a, 41b radiates heat through heat exchange with the aqueous medium circulated through the aqueous medium circuits 80a, 80b by the circulating pumps 43a, 43b. Through the first usage-side flow rate adjustment valves 42a, 42b and the first usage-side liquid refrigerant tubes 45a, 45b, the high-pressure, heat-source-side refrigerant that has radiated its heat in the first usage-side heat exchangers 41a, 41b is fed from the first usage units 4a, 4b to the liquid refrigerant communication tube 13.

The heat-source-side refrigerant fed into the liquid refrigerant communication tube 13 from the heat source unit 2 and the first usage units 4a, 4b converge in the liquid refrigerant communication tube 13, and are fed to the second usage unit 10a. The heat-source-side refrigerant fed to the second usage unit 10a is fed to the second usage-side flow rate adjustment valve 102a. The heat-source-side refrigerant fed to the second usage-side flow rate adjustment valve 102a is depressurized in the second usage-side flow rate adjustment valve 102a where it assumes a low-pressure, gas-liquid two-phase state, and is fed to a second usage-side heat exchanger 101a through a second usage-side liquid refrigerant tube 103a. In the second usage-side heat exchanger 101a, the low-pressure, heat-source-side refrigerant fed to the second usage-side heat exchanger 101a undergoes heat exchange with an air medium supplied by a usage-side fan 105a and evaporates, thereby carrying out air cooling of the indoors. The low-pressure, heat-source-side refrigerant evaporated in the second usage-side heat exchanger 101a is fed from the second usage unit 10a to the gas refrigerant communication tube 14 through a second usage-side gas refrigerant tube 104a.

The low-pressure heat-source-side refrigerant sent to the gas refrigerant communication tube 14 is sent to the heat source unit 2. The low-pressure heat-source-side refrigerant sent to the heat source unit 2 is sent to the heat-source-side accumulator 28 through the gas-side shutoff valve 30, the second heat-source-side gas refrigerant tube 23b, and the heat-source-side switching mechanism 23. The low-pressure heat-source-side refrigerant sent to the heat-source-side accumulator 28 is again drawn into the heat-source-side compressor 21 through the heat-source-side intake tube 21c.

Meanwhile, in the aqueous medium circuits 80a, 80b, the aqueous medium circulating through the aqueous medium circuits 80a, 80b is heated by heat radiated from the heat-source-side refrigerant in the first usage-side heat exchangers 41a, 41b. The aqueous medium heated in the first usage-side heat exchangers 41a, 41b is drawn into the circulating pumps 43a, 43b through the first usage-side water outlet tubes 48a, 48b; and, after being pressurized, is fed from the first usage units 4a, 4b to the aqueous medium communication tubes 16a, 16b. The aqueous medium fed to the aqueous medium communication tubes 16a, 16b is fed to the hot-water storage units 8a, 8b through the aqueous-medium-side switching mechanisms 161a, 161b. In the heat exchange coils 82a, 82b, the aqueous medium fed to the hot-water storage units 8a, 8b radiates heat through heat exchange with the aqueous medium inside the hot water storage tanks 81a, 81b, thereby heating the aqueous medium inside the hot-water storage tanks 81a, 81b.

Operation in the hot-water supply/air-cooling operating mode, whereby hot-water supply operations by the first usage units 4a, 4b and an air-cooling operation of the second usage unit 10a are carried out together, is carried out in the above manner.

<Optimum Refrigerant Control in the Heat Pump System 1>

Figure 2:
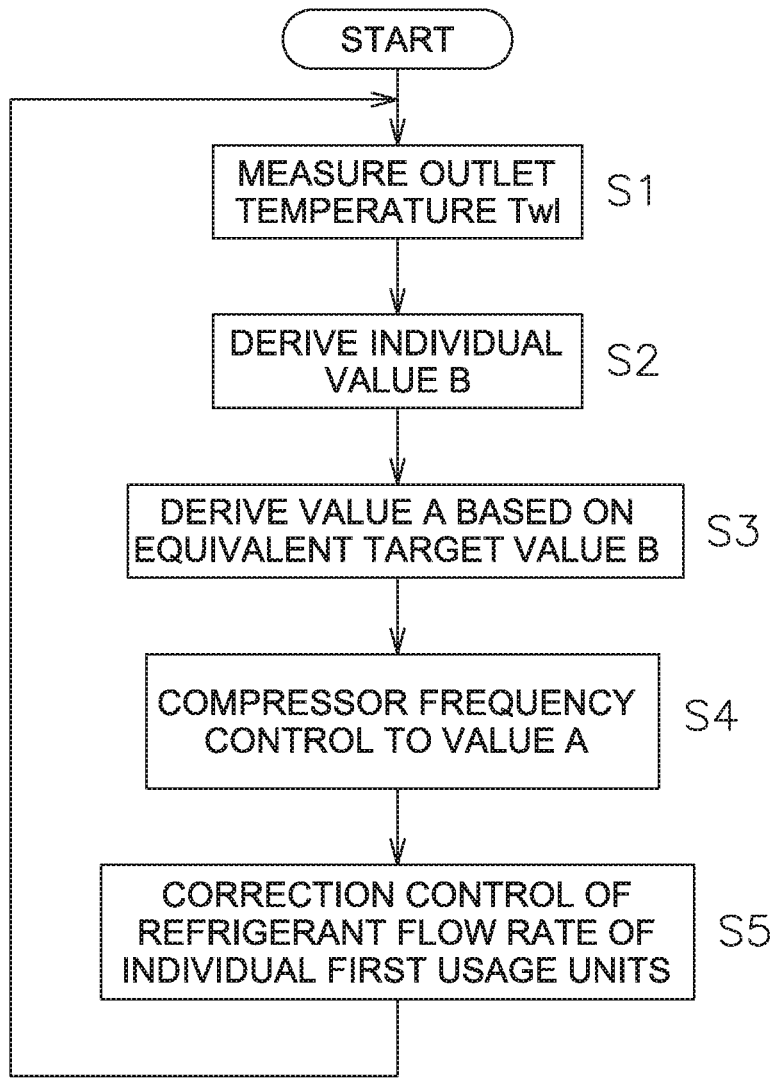
FIG. 2 is a flowchart of optimum refrigerant control of the heat pump system of FIG. 1.

As shown in the flowchart depicted in FIG. 2, the heat pump system 1 of the present embodiment carries out optimum refrigerant control. Refrigerant control is executed by control of the units 2, 4a, 4b, 10a of the heat pump system 1 by a control computer Ct.

First, the control computer Ct essentially controls the operating capacity of the heat-source-side compressor 21 such that a heat-source-side discharge pressure Pd1 of the heat-source-side compressor 21, or a state quantity equivalent thereto, is brought to a first target value A. The heat-source-side discharge pressure Pd1 is detected by the heat-source-side discharge pressure sensor 34.

Then, in Step S1 of FIG. 2, first, an aqueous medium outlet temperature Tw1, which is the temperature of the aqueous medium at the outlets of the first usage-side heat exchangers 41a, 41b of the first usage units 4a, 4b, is measured.

Next, in Step S2, on the basis of the aqueous medium outlet temperature Tw1 measured for each of the individual first usage units 4a, 4b, the control computer Ct derives an equivalent target value B which is a state quantity of the equivalence as the first target value A (e.g., a state quantity which is the same as the discharge pressure, or the like).

Next, in Step S3, the control computer Ct derives an equivalent first target value A on the basis of the largest value B among the plurality of equivalent target values B that were derived in Step S2.

Next, in Step S4, the control computer Ct controls the rotation frequency of the heat-source-side compressor 21 on the basis of the equivalent first target value A that was derived in Step S3.

Together with this, in Step S5, the control computer Ct modifies a degree of subcooling setting value ΔTc for each of the individual first usage units 4a, 4b to carry out correction control of the refrigerant flow rate, specifically, control of the first usage-side flow rate adjustment valves 42a, 42b.

Through control in the above manner, in the heat pump system 1 operated with the plurality of first usage units 4a, 4b and the second usage unit 10a intended for different applications connected to a single heat source unit 2, the individual first usage units 4a, 4b can be supplied with refrigerant in an optimum manner.

—Flow Rate Control of Aqueous Medium Circulated Through Aqueous Medium Circuits—

Next, flow rate control of the aqueous medium circulated through the aqueous medium circuits 80a, 80b in the above-described hot-water supply operation, hot-water supply/air-warming operation, and hot-water supply/air-cooling operation will be described.

In this heat pump system 1, capacity control of the circulating pumps 43a, 43b is carried out such that an aqueous medium outlet/inlet temperature differential ΔTw representing a differential between the temperature of the aqueous medium at the outlets of the first usage-side heat exchangers 41a, 41b (i.e., an aqueous medium outlet temperature Twl) and the temperature of the aqueous medium at the inlets of the first usage-side heat exchangers 41a, 41b (i.e., an aqueous medium inlet temperature Twr) (i.e., Twl-Twr) is brought to a predetermined target aqueous medium outlet/inlet temperature differential ΔTws. More specifically, in a case where the aqueous medium outlet/inlet temperature differential ΔTw is greater than the target aqueous medium outlet/inlet temperature differential ΔTws, the flow rate of the aqueous medium circulating through the aqueous medium circuits 80a, 80b is assessed as being low, and the circulating pump motors 44a, 44b are controlled to increase the rotation speed (i.e., the operating frequency) thereof to increase the operating capacity of the circulating pumps 43a, 43b; whereas in a case where the aqueous medium outlet/inlet temperature differential ΔTw is less than the target aqueous medium outlet/inlet temperature differential ΔTws, the flow rate of the aqueous medium circulating through the aqueous medium circuits 80a, 80b is assessed as being high, and the circulating pump motors 44a, 44b are controlled to decrease the rotation speed (i.e., the operating frequency) thereof to decrease the operating capacity of the circulating pumps 43a, 43b. Because of this, the flow rate of the aqueous medium circulated through the aqueous medium circuits 80a, 80b can be controlled in an optimum manner. The target aqueous medium outlet/inlet temperature differential ΔTws is set with consideration to design conditions for heat exchange capability of the first usage-side heat exchangers 41a, 41b, and the like.

<Features of the First Embodiment>

(1)

As discussed above, the heat pump system 1 of the first embodiment is provided with a heat source unit 2 having a heat-source-side compressor 21 and a heat-source-side heat exchanger 24 functioning as an evaporator for a refrigerant; and a plurality of usage units 4a, 4b, 10a connected to the heat source unit 2 and having usage-side heat exchangers 41a, 41b, 101a that function as radiators for the refrigerant.

Moreover, the heat pump system 1 controls the operating capacity of the heat-source-side compressor 21 to bring the discharge pressure of the heat-source-side compressor 21, or a state quantity equivalent thereto, to a first target value A. The first target value A is determined on the basis of a first equivalent target value B relating to an aqueous medium temperature equivalent to the usage temperature required in each of the individual first usage units 4a, 4b.

Through control in the above manner, in the heat pump system 1 operated with a plurality of first usage units 4a, 4b and a second usage unit 10a for different applications connected to the single heat source unit 2, the individual first usage units 4a, 4b can be supplied with refrigerant in an optimum manner.

(2)

Specifically, in the heat pump system 1 of the first embodiment, in a system wherein the first usage units 4a, 4b provided as hot-water heating units for the purpose of hot-water circulation type air warming such as floor air-warming or of supplying hot water are connected to the heat source, with a plurality of these hot-water heating units being multi connectable in parallel as needed, it is possible for refrigerant to be supplied in an optimum manner to each of the hot-water heating units.

Here, in hot-water heaters for the purpose of hot-water-circulation type air-warming such as floor air-warming or of supplying hot water, typically, control of the apparatus is carried out constantly to ensure that the supplied outlet-side water temperature is at a particular temperature. Where applications for the hot water differ, the outlet temperature naturally differs as well. For example, for floor air-warming, it is about 35° C.; for a low temperature panel heater, about 45° C.; and for a hot water supply, about 40 to 60° C. In the heat pump system 1 operated with a plurality of hot-water heaters for different applications such as these connected to a single heat source, a technical problem relates to how to supply refrigerant to the individual first usage units 4a, 4b.

In the heat pump system 1 of the first embodiment, this technical problem is solved by controlling the operating capacity of the heat-source-side compressor 21 using an equivalent first target value A which is determined on the basis of an equivalent target value B equivalent to the usage temperature required in each of the individual first usage units 4a, 4b.

(3)

Also, in the heat pump system 1 of the first embodiment, the plurality of usage units 4a, 4b include a plurality of first usage units 4a, 4b capable of heating the aqueous medium through radiation by the refrigerant in the individual usage-side heat exchangers 41a, 41b. The equivalent target value is a first equivalent target value B based on an aqueous medium temperature equivalent to the usage temperature required in each of the individual first usage units 4a, 4b. The first target value A is determined on the basis of the greatest value among the equivalent target values B of the individual first usage units 4a, 4b. Consequently, it is possible to carry out optimum refrigerant control for all of the first usage units 4a, 4b.

(4)

Also, in the heat pump system 1 of the first embodiment, control of the first usage-side flow rate adjustment valves 42a, 42b which are the refrigerant flow rate control elements (means) is carried out using a correction value based on the differential of the first target value A and the first equivalent target value B, for whichever of the first usage units 4a, 4b is the first usage unit 4a, 4b that has a first target value A greater than the first equivalent target value B. Because of this, it is possible to carry out optimum refrigerant control for all of the first usage units 4a, 4b.

(5)

Also, in the heat pump system 1 of the first embodiment, control of the first usage-side flow rate adjustment valves 42a, 42b is carried out by modifying the degree of subcooling setting value, whereby the degree of subcooling in the usage-side heat exchangers 41a, 41b of the first usage units 4a, 4b can be controlled to a constant value, making it possible as a result to carry out optimum refrigerant control for all of the first usage units 4a, 4b.

(Modified Example of First Embodiment)

(A)

In the heat pump system 1 of the aforedescribed first embodiment, the first usage units 4a, 4b are designed for direct heat exchange to be carried out between the refrigerant of the heat-source-side refrigerant circuit 20 and the water of the aqueous medium circuits 80a, 80b by the first usage-side heat exchangers 41a, 41b; however, the present invention is not limited thereto, and may instead be configured as a cascade-type heat pump system with a separate refrigerant circuit intervening between the heat-source-side refrigerant circuit 20 and the aqueous medium circuits 80a, 80b. In this case as well, by carrying out the operation control of the aforedescribed embodiment, in the heat pump system 1 operated with a plurality of first usage units 4a, 4b and a second usage unit 10a for different applications connected to a single heat source unit 2, the refrigerant can be supplied in an optimum manner to the individual first usage units 4a, 4b through control in the above manner.

(Second Embodiment)

<Configuration>

—Overall—

Figure 3:
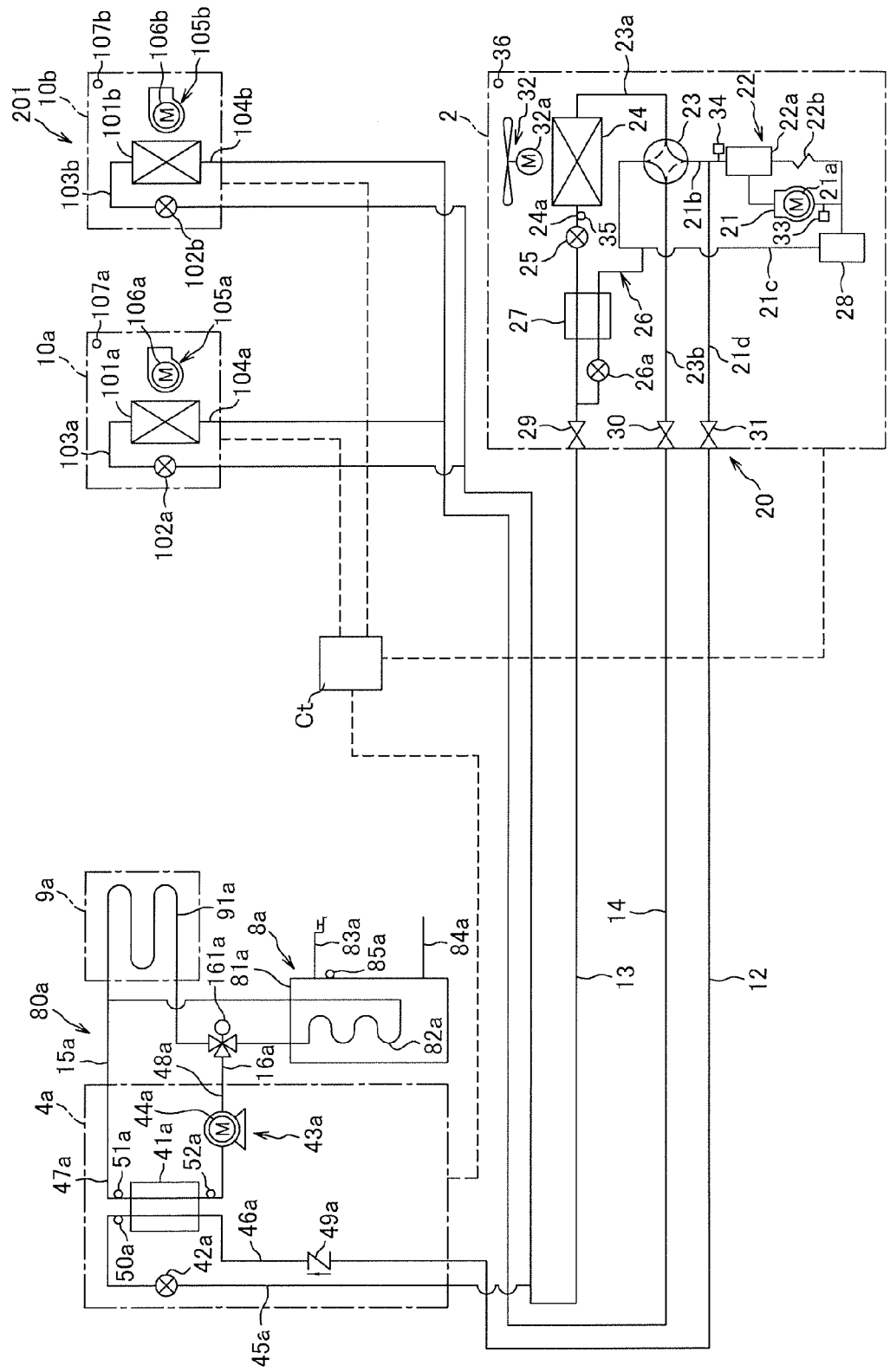
FIG. 3 is a circuit diagram of a heat pump system according to a second embodiment of the present invention.

FIG. 3 is a view showing the general configuration of a heat pump system 201 according to a second embodiment of the present invention. Like the heat pump system 1 of the aforedescribed first embodiment, the heat pump system 201 of the second embodiment is a device capable of utilizing a vapor compression type heat pump cycle to carry out operations to heat an aqueous medium.

However, the heat pump system 201 of the second embodiment differs from the heat pump system 1 of the aforedescribed first embodiment in having one first usage unit 4a and two second usage units 10a, 10b.

Specifically, the heat pump system 201 is primarily provided with a heat source unit 2; one first usage unit 4a; two second usage units 10a, 10b; a discharge refrigerant communication tube 12; a liquid refrigerant communication tube 13; a gas refrigerant communication tube 14; a hot-water storage unit 8a; a hot-water air-warming unit 9a; aqueous medium communication tubes 15a, 15b; and aqueous medium communication tubes 16a, 16b. The heat source unit 2, the first usage unit 4a, and the second usage units 10a, 10b are connected via the refrigerant communication tubes 12, 13, 14, thereby constituting a heat-source side refrigerant circuit 20; while the first usage unit 4a, the hot-water storage unit 8a, and the hot-water air-warming unit 9a are connected via the aqueous medium communication tubes 15a, 16a, thereby constituting an aqueous medium circuit 80a. HFC-410A, which is a type of HFC-based refrigerant, is enclosed in the heat-source-side refrigerant circuit 20 as the heat-source-side refrigerant, while an ester-based or ether-based refrigerant machine oil having compatibility with the HFC-based refrigerant is enclosed in the heat-source-side refrigerant circuit 20 for lubricating a heat-source-side compressor 21 (discussed later). Water is circulated as an aqueous medium through the aqueous medium circuit 80a.

The second usage unit 10a of the second embodiment has a configuration identical to the second usage unit 10b, with the two being connected in parallel with one another to the refrigerant communication tubes 13, 14.

—Second Usage Units—

The second usage units 10a, 10b are installed indoors, and are connected to the heat source unit 2 via the refrigerant communication tubes 13, 14, while being connected to one another as well. The second usage units 10a, 10b constitute part of the heat-source-side refrigerant circuit 20.

The second usage units 10a, 10b primarily have second usage-side heat exchangers 101a, 101b and second usage-side flow rate adjustment valves 102a, 102b.

The second usage-side heat exchangers 101a, 101b are heat exchangers that function as radiators or evaporators for a heat-source-side refrigerant by carrying out heat exchange between the heat-source-side refrigerant and an air medium of indoor air; second usage-side liquid refrigerant tubes 103a, 103b are connected to the liquid side thereof, while second usage-side gas refrigerant tubes 104a, 104b are connected to the gas side thereof. The liquid refrigerant communication tube 13 is connected to the second usage-side liquid refrigerant tubes 103a, 103b, and the gas refrigerant communication tube 14 is connected to the second usage-side gas refrigerant tubes 104a, 104b. The air medium which carries out heat exchange with the heat-source-side refrigerant in the second usage-side heat exchangers 101a, 101b is supplied by usage-side fans 105a, 105b which are driven by usage side fan motors 106a, 106b.

The second usage-side flow rate adjustment valves 102a, 102b are electrical expansion valves whereby, through control of the degree of opening thereof, it is possible to vary the flow rate of heat-source-side refrigerant flowing through the second usage-side heat exchangers 101a, 101b; the valves are furnished to the second usage-side liquid refrigerant tubes 103a, 103b.

Because of this, in the second usage units 10a, 10b, with the heat-source-side switching mechanism 23 in the heat-source-side radiating operation state, the second usage-side heat exchangers 101a, 101b function as evaporators for the heat-source-side refrigerant that is introduced from the liquid refrigerant communication tube 13, whereby it is possible for the heat-source-side refrigerant which has evaporated in the second usage-side heat exchangers 101a, 101b to be directed into the gas refrigerant communication tube 14, and to carry out an air-cooling operation to cool the air medium through evaporation of the heat-source side refrigerant in the second usage-side heat exchangers 101a, 101b. With the heat-source-side switching mechanism 23 in the heat-source-side evaporating operation state, the second usage-side heat exchangers 101a, 101b function as radiators for the heat-source-side refrigerant that is introduced from the gas refrigerant communication tube 14, whereby it is possible for the heat-source-side refrigerant which has radiated its heat in the second usage-side heat exchangers 101a, 101b to be directed into the liquid refrigerant communication tube 13, and to carry out an air-warming operation to heat the air medium by heat radiated from the heat-source-side refrigerant in the second usage-side heat exchangers 101a, 101b.

The second usage units 10a, 10b are also furnished with various types of sensors. Specifically, the second usage units 10a, 10b are furnished with indoor temperature sensors 107a, 107b for detecting an indoor temperature Tr.

Like the heat pump system 201 of the first embodiment, it is possible for the heat pump system 201 of the second embodiment to operate in a hot-water supply operating mode, an air-cooling operating mode, an air-warming operating mode, a hot-water supply/air-warming operating mode, and a hot-water supply/air-cooling operating mode.

In a case where an air-cooling or air-warming operation of either of the second usage units 10a, 10b is halted, and an air-cooling or air-warming operation is carried out only by the other, the first usage-side flow rate adjustment valves 102a, 102b of the first usage unit 10a, 10b whose air-cooling or air-warming operation is halted may be closed. The same applies to cases of the hot-water supply/air-warming operation and the hot-water supply/air-cooling operation to be discussed below.

<Optimum Refrigerant Control in the Heat Pump System 201>

Figure 4:
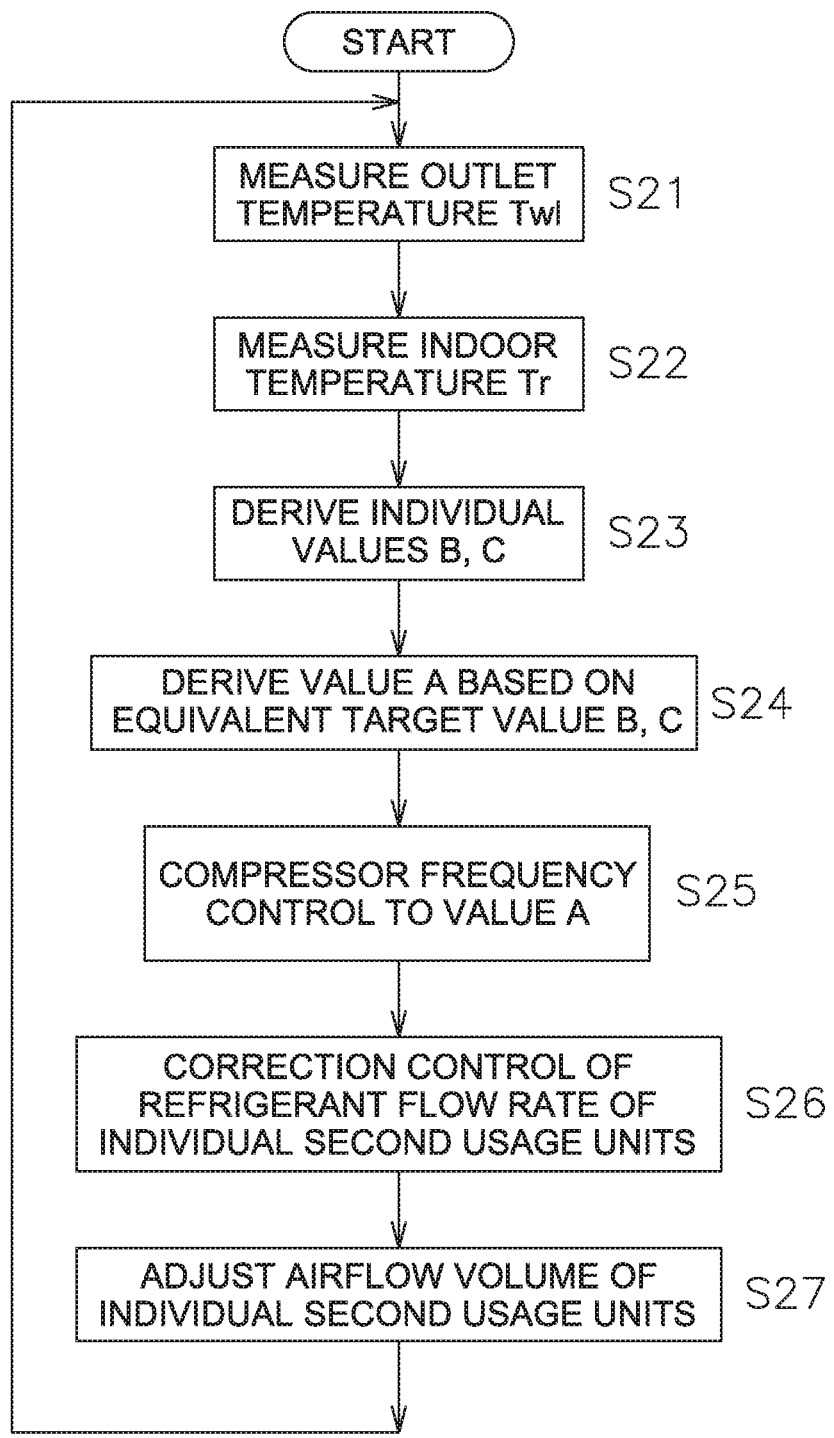
FIG. 4 is a flowchart of optimum refrigerant control of the heat pump system of FIG. 3.

As shown in the flowchart depicted in FIG. 4, the heat pump system 201 of the second embodiment carries out optimum refrigerant control. Refrigerant control is executed by control of the units 2, 4a, 10a, and 10b of the heat pump system 201 by a control computer Ct.

First, the control computer Ct essentially controls the operating capacity of the heat-source-side compressor 21 such that the heat-source-side discharge pressure Pd1 of the heat-source-side compressor 21, or a state quantity equivalent thereto, is brought to a first target value A. The heat-source-side discharge pressure Pd1 is detected by the heat-source-side discharge pressure sensor 34.

Then, in Step S21 of FIG. 4, first, an aqueous medium outlet temperature Tw1, which is the temperature of the aqueous medium at the outlet of the first usage-side heat exchanger 41a of the first usage unit 4a, is measured.

Next, in Step S22 of FIG. 4, an indoor temperature Tr of the second usage units 10a, 10b is measured. The indoor temperature Tr is detected by the indoor temperature sensors 107a, 107b.

Next, in Step S23, on the basis of the aqueous medium outlet temperature Tw1 measured for the first usage unit 4a, the control computer Ct derives an equivalent target value B which is a state quantity of the equivalence as the first target value A (e.g., a state quantity which is the same as discharge pressure, or the like). Also, on the basis of the indoor temperature Tr measured for the individual second usage units 10a, 10b, the control computer Ct derives respective equivalent target values C. The equivalent target value C is also a state quantity of the equivalence as the first target value A.

Next, in Step S24, the control computer Ct derives an equivalent first target value A on the basis of the largest values B and C among the plurality of equivalent target values B, C that were derived in Step S23.

Next, in Step S25, the control computer Ct controls the rotation frequency of the heat-source-side compressor 21 on the basis of the equivalent first target value A that was derived in Step S24.

Then, in Step S26, the control computer Ct modifies a degree of subcooling setting value ΔTc for the individual second usage units 10a, 10b to carry out correction control of the refrigerant flow rate, specifically, control of the second usage-side flow rate adjustment valves 102a, 102b.

Then, in Step S27, the control computer Ct adjusts the airflow rate for the individual second usage units 10a, 10b. For example, in a case where the first target value A is greater than the second equivalent target value C, the fan airflow rate of the second usage units 10a, 10b is controlled to a smaller value, to minimize (save) capability through the airflow rate.

Through control performed in the above manner, in the heat pump system operated with the plurality of first usage units 4a and second usage units 10a, 10b intended for different applications connected to a single heat source unit 2, the first usage units 4a and the second usage units 10a, 10b can be supplied with refrigerant in an optimum manner.

<Features of the Second Embodiment>

(1)

As discussed above, the heat pump system 201 of the second embodiment is provided with a heat source unit 2 having a heat-source-side compressor 21 and a heat-source-side heat exchanger 24 functioning as an evaporator for a refrigerant; and a plurality of usage units 4a, 10a, 10b connected to the heat source unit 2 and having usage-side heat exchangers 41a, 101a, 101b that function as radiators for the refrigerant.

Moreover, the heat pump system 201 controls the operating capacity of the heat-source-side compressor 21 to bring the discharge pressure of the heat-source-side compressor 21, or a state quantity equivalent thereto, to a first target value A. The first target value A is then determined on the basis of a first equivalent target value B equivalent to the usage temperature required in the first usage units 4a, 4b, and a second equivalent target value C equivalent to the indoor temperature Tr required in the individual second usage units 10a, 10b.

By performing a control such as described above, in the heat pump system operated with the plurality of first usage units 4a and second usage units 10a, 10b for different applications connected to the single heat source unit 2, the individual usage units can be supplied with refrigerant in an optimum manner.

(2)

Also, in the heat pump system 201 of the present embodiment, the plurality of usage units 4a, 4b, 10a includes a first usage unit 4a capable of heating the aqueous medium through heat radiation by the refrigerant in the usage-side heat exchanger 41a; and a plurality of second usage units 10a, 10b capable of heating the air medium through heat radiation by the refrigerant in the usage-side heat exchangers 101a, 101b. The equivalent target values include a first equivalent target value B relating to an aqueous medium temperature equivalent to the usage temperature required in the first usage unit 4a, and a second equivalent target value C relating to an air medium temperature equivalent to the usage temperature required in the plurality of second usage units 10a, 10b. Further, the first target value A is determined on the basis of the greatest value among the first equivalent target values B and the second equivalent target values C of the usage units.

Because of this, it is possible to carry out optimum refrigerant control for all of the usage units, specifically, the first usage unit 4a and the second usage units 10a, 10b.

(3)

In the heat pump system 201 of the second embodiment which operates with a plurality of usage units 4a, 10a, 10b for different applications connected to a single heat source in this way, a technical problem is that of how to supply the refrigerant to the individual usage units 4a, 10a, 10b. The present invention constitutes means for solving this problem. Unless the temperature is increased to higher than the required temperature insufficient capability can be a problem. On the other hand, in cases where the temperature is increased to excessively higher than the required temperature, capability may become excessive, possibly causing the apparatus to stop. In order to solve this, pressure targeted to the unit having the highest of the indoor temperatures required in the second usage units 10a, 10b is employed; and for units with excessive capability, capability is minimized with the refrigerant flow rate valves 102a, 102b.

(4)

However, in the second usage units 10a, 10b, which are air-conditioning units, because the usage-side heat exchangers 101a, 101b are large, collection of refrigerant in the heat exchangers in this case can be a problem.

In the heat pump system 201 of the second embodiment, in a case where, as in the above-described Step S27 of FIG. 4, the first target value A is greater than the second equivalent target value C, the fan airflow rate of the second usage units 10a, 10b is controlled so as to decrease. It is possible to save capability through airflow rate, and effectively prevent refrigerant from collecting in the second usage units 10a, 10b.

(Modified Example of Second Embodiment)

(A)

As in the case of the first embodiment, the heat pump system 201 of the second embodiment may be configured as a cascade-type heat pump system having a separate refrigerant circuit disposed between the heat-source-side refrigerant circuit 20 and the aqueous medium circuit 80a. In this case as well, by carrying out the operation control of the aforedescribed embodiment, in the heat pump system 201 operated with a plurality of first usage units 4a and second usage units 10a, 10b for different applications connected to a single heat source unit 2, the refrigerant can be supplied in an optimum manner to the first usage unit 4a and the second usage units 10a, 10b through control in the above manner.

INDUSTRIAL APPLICABILITY

Various applications of the present invention are possible in heat pump systems operated with a plurality of usage units connected to a single heat source unit.

What is claimed is:

1. A heat pump system comprising:
a heat source unit having a variable-capacity compressor, a pressure sensor disposed in an outlet of the compressor, and a heat-source-side heat exchanger functioning as an evaporator for a refrigerant;
a plurality of usage units connected to the heat source unit, each of the usage units having a usage-side heat exchanger that functions as a radiator for the refrigerant, the plurality of units being a plurality of first usage units capable of heating an aqueous medium through radiation by the refrigerant in the individual usage-side heat exchangers, and a temperature sensor being provided at an outlet of each of the usage-side heat exchangers; and
a controller including a computer configured to control the heat pump system,
the heat source unit and the plurality of the first usage units constituting a heat source refrigerant circuit in which the refrigerant circulates,
the plurality of first usage units constituting an aqueous medium circuit in which the aqueous medium circulates, and
the controller being further configured to
derive an equivalent target value to control an operating capacity of the compressor based on a usage temperature required in the individual usage units, the equivalent target value being determined based on an aqueous medium outlet temperature which is a temperature of the aqueous medium at the outlet of each of the usage-side heat exchangers,
select a greatest value among the equivalent target values of the individual first usage units, and
control the operating capacity of the compressor to bring discharge pressure of the compressor, or a state quantity equivalent thereto, to a target value thereof based on the greatest value among the equivalent target values of the individual first usage units, and
the controller being further configured to control a refrigerant flow rate control valve disposed in the first usage unit for which the target value is greater than the first equivalent target value by using a correction value based on a differential of the target value and the equivalent target value.

2. The heat pump system as recited in claim 1, wherein control of the refrigerant flow rate control valve is carried out by modifying a degree of subcooling setting value.

3. The heat pump system comprising:
a heat source unit having a variable-capacity compressor, a pressure sensor disposed in an outlet of the compressor, and a heat-source-side heat exchanger functioning as an evaporator for a refrigerant;
a plurality of usage units connected to the heat source unit, the plurality of usage units including a first usage unit configured to heat an aqueous medium through radiation by the refrigerant and second usage unit configured to heat an air medium through radiation by the refrigerant, the first usage unit having a first usage-side heat exchanger that functions as a radiator for the refrigerant, a temperature sensor being provided at an outlet of the first usage-side heat exchanger, and the second usage unit having a second usage-side heat exchanger that functions as a radiator for the refrigerant; and
a controller including a computer configured to control the heat pump system,
the heat source unit, the first usage unit and the second usage unit constituting a heat source refrigerant circuit in which the refrigerant circulates,
the first usage unit constituting an aqueous medium circuit in which the aqueous medium circulates, and
the controller being further configured to
derive equivalent target values to control an operating capacity of the compressor based on a usage temperature required in the individual usage units, the equivalent target values including
a first equivalent target value relating to an aqueous medium outlet temperature which is a temperature of the aqueous medium at the outlet of the first usage-side heat exchanger, and
a second equivalent target value relating to an air medium temperature equivalent to a usage temperature required in the second usage unit,
determine a greater value between the first equivalent target value and the second equivalent target value, and
control the operating capacity of the compressor to bring discharge pressure of the compressor, or a state quantity equivalent thereto, to a target value thereof based on the greater value between the first equivalent target value and the second equivalent target value, and
in a case where the target value is greater than the second equivalent target value, a control being performed so that a fan airflow rate of the second usage unit decreases.

* * * * *